No. 862,434. PATENTED AUG. 6, 1907.
W. P. BARTEL.
RIVET.
APPLICATION FILED JAN. 5, 1907.
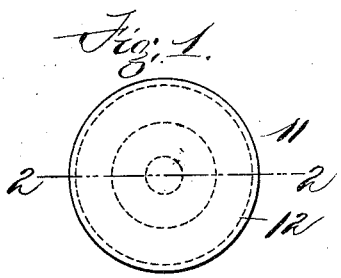
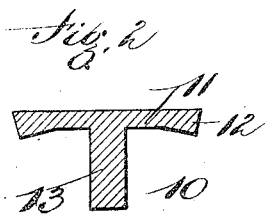
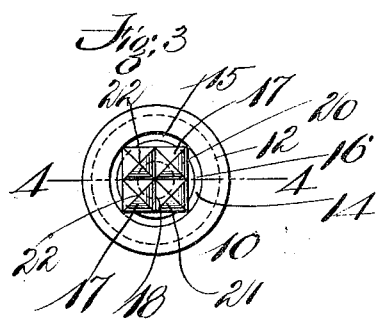
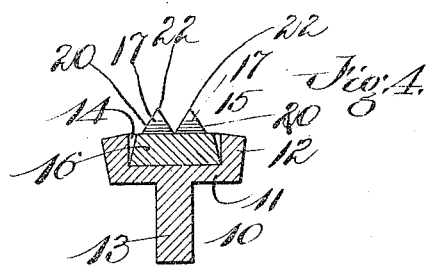
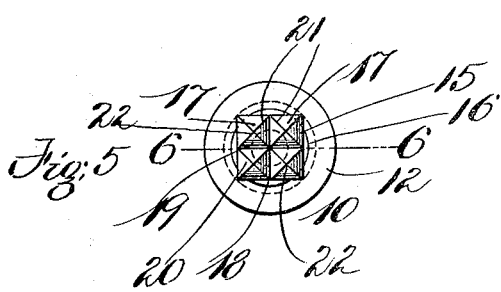
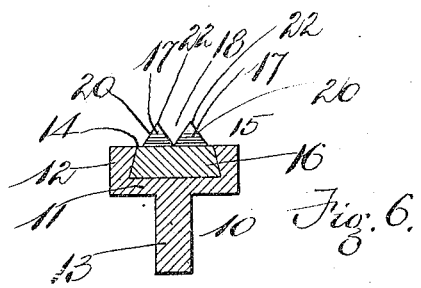
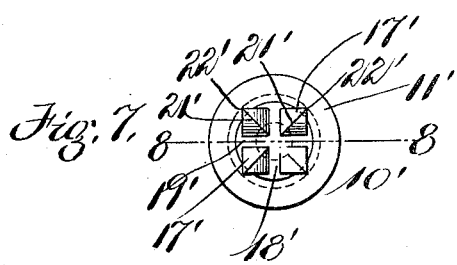
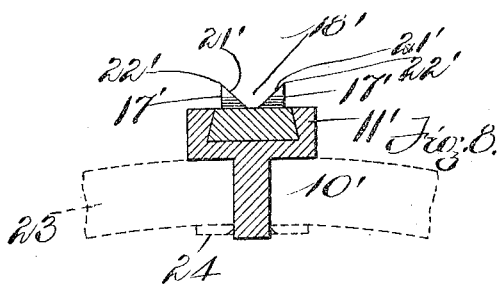
Witnesses:
Ernest A. Telfer
Walter L. Pierce
Inventor:
William P. Bartel
by his attorney, Charles S. Gosling

UNITED STATES PATENT OFFICE.

WILLIAM P. BARTEL, OF WALTHAM, MASSACHUSETTS, ASSIGNOR TO JUDSON L. THOMSON M'F'G COMPANY, A CORPORATION OF MAINE.

RIVET.

No. 862,434.   Specification of Letters Patent.   Patented Aug. 6, 1907.

Application filed January 5, 1907. Serial No. 350,871.

*To all whom it may concern:*

Be it known that I, WILLIAM P. BARTEL, a citizen of the United States, residing at Waltham, in the county of Middlesex and State of Massachusetts, have invented new and useful Improvements in Rivets, of which the following is a specification.

This invention relates to a two-part rivet, which is particularly adapted to be used in connection with the tires of vehicles, such as automobiles.

The object of the invention is to provide a rivet which can be easily and strongly fastened to a piece of leather, rubber, or the like, constituting a portion of the tire of a vehicle, so that the same will project beyond the tread of the tire and prevent the wheel from slipping circumferentially or from slipping sidewise or skidding, so called, upon slippery or icy surfaces.

The invention consists in a two-part rivet formed and constructed as set forth in the following specification and particularly as pointed out in the claims thereof.

Referring to the drawings: Figure 1 is a plan view of a rivet shank partly formed in accordance with my invention. Fig. 2 is a section taken on line 2—2 of Fig. 1. Fig. 3 is a plan view of a rivet shank formed to receive a piece of hardened metal constituting the head, with said piece of hardened metal located in a recess formed in the upper face of the flange. Fig. 4 is a sectional elevation taken on line 4—4 of Fig. 3. Fig. 5 is a plan view of the completed rivet. Fig. 6 is a section taken on line 6—6 of Fig. 5. Fig. 7 is a plan view of a modified form of rivet. Fig. 8 is a section taken on line 8—8 of Fig. 7.

Like numerals refer to like parts throughout the several views of the drawings.

In the drawings Figs. 1 and 2 show a rivet, with a flat head, which, when completely formed, constitutes the shank 10 to which the hardened piece of metal forming the head is affixed, as hereinafter described. The shank 10 has a flange 11 preferably integral therewith, the outer portion 12 of said flange, that is the portion adjacent to the periphery thereof, being thicker than that portion adjacent to the stem 13.

In Figs. 4 and 5 the shank is illustrated with the outer portion 12 bent upwardly to form a rim which incloses a recess 14 in which the hardened piece of metal constituting the head 15 is placed, as illustrated in Fig. 4. The head 15 has a conical base 16 and when the rivet is finally completed, as illustrated in Figs. 5 and 6, the rim 12 is forced into a cylindrical hole formed in a suitable female die, thus closing said rim upon the conical base 16 and locking the head 15 to the shank 10, as clearly shown in Fig. 6. The head 15 has pyramidal projections 17 upon the top thereof which are separated from each other by intersecting grooves 18, 19.

The sides of the grooves 18 and 19 are preferably formed upon an angle to the top of the base 16 and the outer edge 20 of said head is also formed upon an angle, thus resulting in four pyramidal projections 17, 17, 17, 17 terminating in points 22, 22 with cutting edges 21, 21 extending from said points downwardly toward the base of the head 15.

It will be noted that in its final and completed form the rim or outer periphery of the flange 11 is cylindrical, while the recess 14 becomes frusto-conical, this formation being obtained, as hereinbefore set forth, by forcing the shank, with a frusto-conical periphery, as illustrated in Fig. 4, into a cylindrical recess in a female die, the rim thus being crowded back into the recess 14 and changing the shape thereof from a cylindrical recess to a frusto-conical recess.

The completed rivet is attached to a piece of rubber 23, leather or the like by riveting the same to a washer 24 in a well known manner.

In use the device is riveted, as described, to the tread of the tire of the vehicle, either to a piece of leather or rubber or any suitable material which may be attached to or vulcanized upon an automobile tire. It is evident that the projecting points or projections 17, 17 will cut into ice in slippery weather and will also prevent the wheels from skidding or slipping circumferentially thereof upon any surface.

The hardened piece of metal forming the head adds very much to the wearing qualities of the rivet and even after the projections 17 become worn, said rivet will perform the function of preventing the tire from slipping, although to a less degree than in the case where the projections are sharp.

The form of the projections 17 may be varied without departing from the spirit of my invention and in Figs. 7 and 8 a variation in the form of said projections is illustrated, the remainder of the rivet being substantially the same as that illustrated in Figs. 5 and 6, hereinbefore described.

In Figs. 7 and 8 the head 15 is not beveled upon its outer upper edge as in the form illustrated in Fig. 6, but has straight sides, so that the grooves 18′ and 19′ intersect to form cutting edges 21′, 21′ which extend downwardly from the points 22′ to the base 16′ of the head. The base 16′ in this form of my invention is frusto-conical and fits into a corresponding recess in the flange 11′ of the shank 10′.

Having thus described my invention, what I claim and desire by Letters Patent to secure is:

1. A rivet comprising a head and a shank, said shank having a cylindrical flange provided with a frusto-conical recess in its upper face, said head having a conical base fitting into said recess and having a plurality of projections thereon.

2. A rivet comprising a head and a shank, said shank having a cylindrical flange integral therewith and provided with a recess in its upper face, said head located in said recess and formed to interlock with the side walls thereof.

3. A rivet comprising a head and a shank, said shank having a cylindrical flange provided with a frusto-conical recess in its upper face, said head formed to fit in said recess.

In testimony whereof I have hereunto set my hand in presence of two subscribing witnesses.

WILLIAM P. BARTEL.

Witnesses:
 CHARLES S. GOODING,
 ANNIE J. DAILEY.